(12) United States Patent
Vinayaka et al.

(10) Patent No.: US 12,288,192 B2
(45) Date of Patent: Apr. 29, 2025

(54) SOFTWARE DEVELOPMENT LIFECYCLE TRACEABILITY TOOL

(71) Applicant: Citibank, N.A., New York, NY (US)

(72) Inventors: Mayank Vinayaka, Irving, TX (US); Ryan Peterman, Jacksonville, FL (US); Badari Narayana Shanka Prasad, Irving, TX (US); Richard Lawton, Irving, TX (US); Vitthal Ramling Betgar, New York, NY (US); Adar Danait, New York, NY (US); Balaji Kumar, New York, NY (US); Robin J. Kurian, New York, NY (US); Maneet Sharma, New York, NY (US); Anantha Veerasami, New York, NY (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/925,536

(22) Filed: Oct. 24, 2024

(65) Prior Publication Data

US 2025/0045698 A1    Feb. 6, 2025

Related U.S. Application Data

(63) Continuation-in-part of application No. 18/380,114, filed on Oct. 13, 2023, now Pat. No. 12,236,400, which is a continuation of application No. 18/124,870, filed on Mar. 22, 2023, now Pat. No. 11,797,936.

(51) Int. Cl.
*G06Q 10/06* (2023.01)
*G06Q 10/0631* (2023.01)
*G06Q 10/10* (2023.01)
*G06Q 10/101* (2023.01)

(52) U.S. Cl.
CPC ... *G06Q 10/103* (2013.01); *G06Q 10/063114* (2013.01)

(58) Field of Classification Search
CPC .................. G06Q 10/103; G06Q 10/063114
USPC .......................................... 705/1.1–912, 301
See application file for complete search history.

(56) References Cited

U.S. PATENT DOCUMENTS

| 10,503,478 | B2 * | 12/2019 | Maurya ..................... G06F 8/20 |
| 11,093,370 | B1 | 8/2021 | Sivanantham et al. |
| 2016/0055079 | A1 | 2/2016 | Hanna |
| 2021/0326239 | A1 * | 10/2021 | Vaughan .................. G06F 8/77 |
| 2022/0342663 | A1 | 10/2022 | Barkaee |
| 2023/0065424 | A1 | 3/2023 | Jain |
| 2023/0065530 | A1 * | 3/2023 | Mohanty ............... H04L 41/082 |

(Continued)

*Primary Examiner* — Jonathan P Ouellette
(74) *Attorney, Agent, or Firm* — Perkins Coie LLP

(57) ABSTRACT

Systems and methods for a software development lifecycle traceability tool. In some aspects, the system may implement a traceability tool that generates a system data stream for an SDLC management platform that stitches together source data from multiple sources, trains a machine learning model to generate progress information and execution risks for a user story on the SDLC management platform, generates a graphical user interface with information for each user story and corresponding progress tracking indicia based on output from the machine learning model, and generates an event-based view of prior actions for each user story and one or more recommended actions to address execution risks.

20 Claims, 12 Drawing Sheets

(56) References Cited

U.S. PATENT DOCUMENTS

2023/0130027 A1     4/2023  Mason
2023/0261876 A1*    8/2023  Kumar ..................... G06F 8/71
                                                         713/168

* cited by examiner

200

```
┌─────────────────────────────────────────────────────────────────────────────┐
│ Generate a system data stream for an SDLC management platform that stitches │
│ together data from a plurality of computing systems 202                     │
└─────────────────────────────────────────────────────────────────────────────┘
                                      ↓
┌─────────────────────────────────────────────────────────────────────────────┐
│ Train a machine learning model based on the system data stream to generate  │
│ progress information and one or more execution risks for an input user      │
│ story identifier 204                                                        │
└─────────────────────────────────────────────────────────────────────────────┘
                                      ↓
┌─────────────────────────────────────────────────────────────────────────────┐
│ Generate a query to the machine learning model for each user story          │
│ identifier of the plurality of user stories corresponding to the SDLC       │
│ management platform 206                                                     │
└─────────────────────────────────────────────────────────────────────────────┘
                                      ↓
┌─────────────────────────────────────────────────────────────────────────────┐
│ Based on output from the machine learning model, generate a graphical user  │
│ interface displayable on a client device 208                                │
└─────────────────────────────────────────────────────────────────────────────┘
                                      ↓
┌─────────────────────────────────────────────────────────────────────────────┐
│ For each user story included in the graphical user interface, bind, to two  │
│ or more controls on the graphical user interface, the progress information  │
│ for the user story 210                                                      │
└─────────────────────────────────────────────────────────────────────────────┘
                                      ↓
┌─────────────────────────────────────────────────────────────────────────────┐
│ For each user story included in the graphical user interface, based on the  │
│ one or more execution risks for the user story, generate an event-based     │
│ view of prior actions and one or more recommended actions to address the    │
│ one or more execution risks 212                                             │
└─────────────────────────────────────────────────────────────────────────────┘
```

*FIG. 2*

SOFTWARE DEVELOPMENT LIFECYCLE TRACEABILITY TOOL

CROSS REFERENCE TO RELATED APPLICATIONS

This application is a continuation-in-part of U.S. patent application Ser. No. 18/380,114, filed Oct. 13, 2023, which is a continuation of U.S. patent application Ser. No. 18/124,870, filed Mar. 22, 2023, each of which is hereby incorporated by reference herein in its entirety.

BACKGROUND

In the realm of software engineering, the Software Development Lifecycle (SDLC) is a well-established framework that outlines the process for planning, creating, testing, and deploying an information system. The SDLC aims to produce high-quality software that meets or exceeds customer expectations, reaches completion within time and cost estimates, and is maintainable and scalable. The SDLC process is typically divided into several distinct phases, including requirement analysis, system design, implementation (coding), testing, deployment, and maintenance. Despite the structured approach of the SDLC, traditional methods often face challenges such as inflexibility, prolonged timelines, and difficulty in accommodating changes. Various SDLC models have been developed to address specific issues within the traditional SDLC framework. However, existing software traceability solutions primarily focus on code development, lacking comprehensive end-to-end visibility that encompasses process, software development, and risk management.

BRIEF DESCRIPTION OF THE DRAWINGS

FIG. 2 is a flow diagram illustrating an example process for a software development lifecycle traceability tool that can be executed by the disclosed system in some implementations of the present technology.

Figure 1:
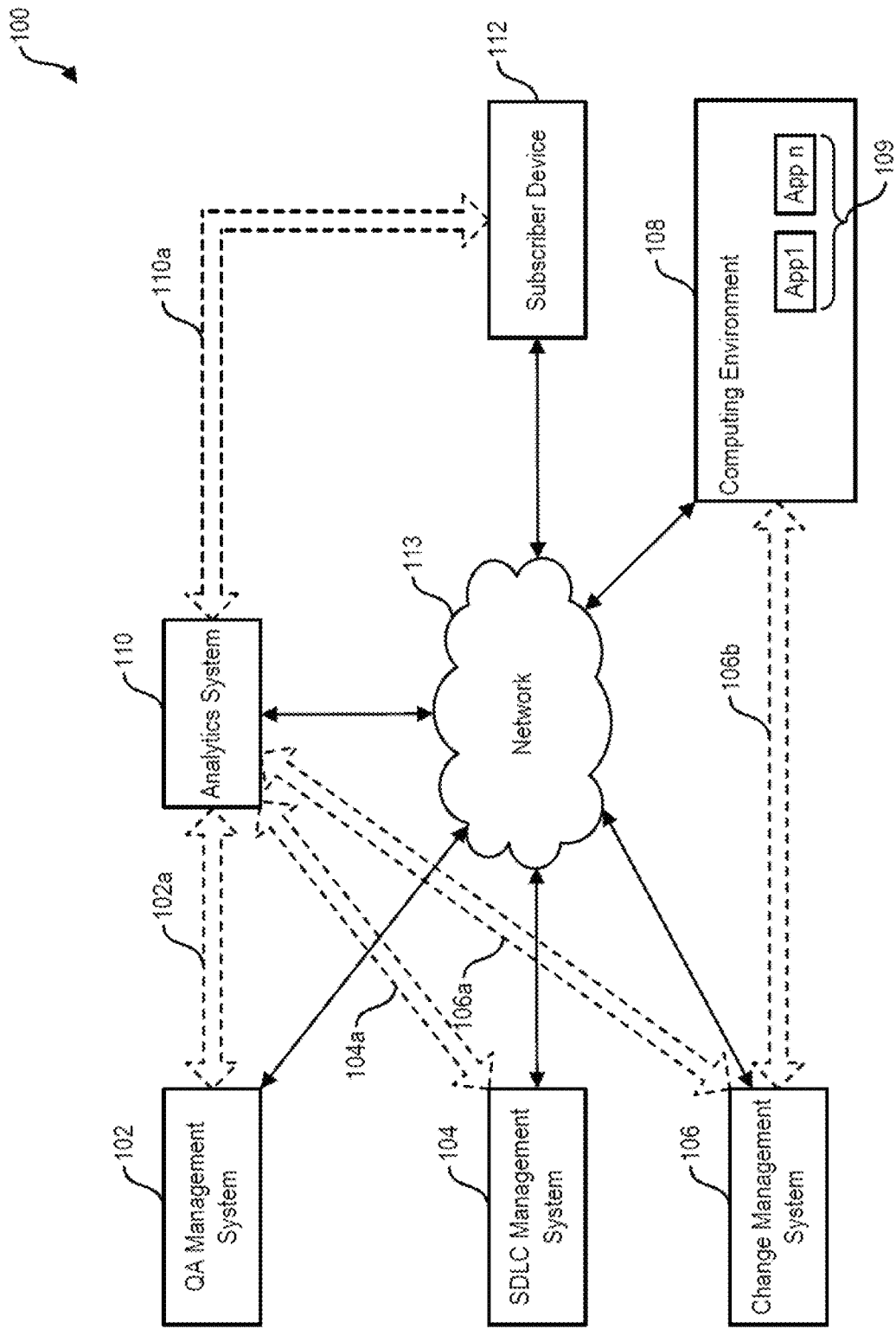
FIG. 1 is a system diagram showing some of the components typically incorporated in at least some of the computer systems and other devices on which the disclosed system operates in accordance with some implementations of the present technology.

The drawings have not necessarily been drawn to scale. For example, the relative sizes of signaling periods in the figures are not to scale, and the size of certain signaling or messaging periods may differ. Similarly, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Conventional approaches to SDLC in large enterprises utilizing distributed software environments face significant challenges in establishing end-to-end traceability of software feature changes. This lack of visibility leads to risks in software delivery, impacts quality and accountability, and increases the likelihood of production incidents that can result in financial, reputational, and/or regulatory damages. This is further exacerbated by inconsistent data collection and manual processes which hinder effective risk management and compliance efforts. Finally, when production incidents occur, many hours are spent by many resources gathering event-based data to form a picture of what led up to the incident and glean insights manually into the root cause and preventative actions for the future.

Developing a system that provides end-to-end traceability and risk management in a distributed software environment presented significant technological uncertainty. The primary challenge was integrating disparate data sources from various tools and platforms used throughout the SDLC, such as JIRA, Git, and Jenkins. Each of these tools has its own data structures, formats, and update frequencies, making it difficult to ensure data consistency and accuracy across the entire SDLC. The complexity was further compounded by the need to handle large volumes of data generated by multiple projects within a large organization. Ensuring that this data could be aggregated, analyzed, and presented in a coherent and actionable manner required overcoming substantial technical hurdles.

Another area of technological uncertainty was the development of machine learning models capable of accurately identifying bottlenecks, risks, and providing actionable recommendations. Training these models required extensive data collection and validation to ensure they could reliably predict issues and suggest effective interventions. The inherent variability and complexity of software development processes meant that the models had to be highly adaptable and capable of learning from a wide range of scenarios. Additionally, the system needed to generate a graphical user interface that could present this information in a user-friendly manner, which involved significant challenges in terms of data visualization and user experience design.

The inventors also faced technological uncertainty in establishing a backward, event-based view of actions taken that led up to a change implementation when incidents occurred in production. This required developing a robust mechanism for tracking and logging every action and event across the SDLC, which could then be analyzed to identify root causes and preventative measures. The challenge was to create a system that could not only capture this data in real-time but also process and analyze it efficiently to provide meaningful insights. This involved experimenting with various logging frameworks and data processing pipelines to ensure that the system could handle the high volume and velocity of data generated in a large enterprise environment.

To address these uncertainties, the inventors systematically evaluated multiple design alternatives. For instance, they experimented with different data integration techniques to ensure seamless data flow between various SDLC tools. One approach involved using middleware to standardize data formats before integration, but this proved to be inefficient due to the high volume of data and the dynamic nature of software development activities. Another alternative was to implement real-time data synchronization mechanisms, which required sophisticated algorithms to handle data conflicts and ensure consistency. The inventors also tested various machine learning algorithms, including supervised and unsupervised learning techniques, to identify the most effective models for predicting risks and generating recommendations. Each of these alternatives presented its own set of challenges and required iterative testing and refinement to achieve the desired level of accuracy and reliability.

The systems and methods described herein provide for a graphical user interface with progress tracking indicia and recommended actions for multiple feature changes (or user stories) to answer questions such as where is the feature change in the SDLC, how can the feature change be enabled to unblock or move faster, and if a blocking incident took place, what prior actions led to it and what recommended actions can be taken to unblock going forward.

Implementing such a graphical user interface that provides end-to-end traceability and risk management can be highly beneficial, but it also comes with several technical challenges. From a technical perspective, integrating data from various tools and platforms used in different stages of the SDLC, such as JIRA for planning, Git for version control, and Jenkins for CI/CD, can be complex. Ensuring data consistency and accuracy across these different systems is crucial for reliable traceability and risk management. Additionally, handling large volumes of data generated throughout the SDLC can be challenging, especially in large organizations with multiple projects. Developing machine learning models that accurately identify bottlenecks, risks, and provide actionable recommendations also requires extensive training and validation.

The systems and methods described herein include a machine learning-powered information system that aggregates and analyzes data from across the entire SDLC. The system may provide a single pane of glass view of the SDLC, highlighting risks, bottlenecks, and outliers. The system may generate actionable recommendations to address identified risks, bottlenecks, and outliers proactively. The system may establish a backward, event-based view of actions taken that led up to a change implementation when incidents have occurred in production. Further, the system may standardize data collection for robust traceability and accountability. In some implementations, the system may continually refine recommended actions based on user acknowledgment of suggested actions taken on previous insights.

In some aspects, the system may implement a traceability tool that provides the above-mentioned functionality by generating a system data stream for an SDLC management platform that stitches together source data from multiple sources, training a machine learning model to generate progress information and execution risks for a feature change (or user story) on the SDLC management platform, generating a graphical user interface with information for each user story and corresponding progress tracking indicia based on output from the machine learning model, and generating an event-based view of prior actions for each user story and one or more recommended actions to address execution risks.

Overview

For brevity, the terms "user" and "subscriber" are used interchangeably, although one of skill will appreciate that certain features of the disclosed systems and techniques can be accessible to individuals or entities that are not registered with service providers. The term "release" refers to distribution, deployment, or other action to make available a system or feature set. A particular release can include one or more units of work ("projects") and/or a particular unit of work ("project") can be associated with one or more releases. Units of work can be performed according to requirements, which can be associated with performance metrics, such as requirements traceability (the ability to follow a requirement from a first particular point to another particular point). Groups of units of work within a project and/or a release can be implemented as a group, as a feature set, in a sprint, etc. Groups of requirements within a project and/or a release can be organized into item groups ("epics" or "user stories").

Example Analytics System(s)

FIG. 1 is a system diagram showing some of the components typically incorporated in at least some of the computer systems and other devices on which the disclosed system operates in accordance with some implementations of the present technology. To solve the technical problems described herein, the inventors have conceived and reduced to practice a computing system structured to facilitate management and presentation of data streams from various source systems. According to various embodiments, the system described herein includes machine learning models and/or other techniques to enable end-to-end traceability of software feature changes for various computing systems within an organization.

As shown, the environment 100 includes a QA management system 102, an SDLC management system 104, a change management system 106, a computing environment 108, an analytics system 110, and a subscriber device 112. As shown, the components are communicatively coupled via network 113. The QA management system 102 can be structured to manage data about requirements, test cases, approvals, accessibility features, and related system features (e.g., in relation to development items for applications 109).

The SDLC management system 104 can be structured to manage data about project planning, deliverables, and/or resources and related system features (e.g., in relation to development items for applications 109). The change management system 106 can be structured to manage data about technology assets (e.g., applications 109, executables, code versions, deployment instances, and the like) and related system features. The computing environment 108 can be an internal or external computing environment that can include various applications 109. The analytics system 110 can be structured to perform the operations described herein, such as, for example, the operations described in relation to FIG. 2. Various user interfaces generated by the analytics system 110 can be presented to subscribers using one or more of subscriber devices 112.

In operation, the analytics system 110 can receive data streams from any of the QA management system 102, SDLC management system 104, change management system 106, computing environment 108, and/or subscriber device 112. For example, QA management system 102 can provide a data stream 102a, which can include test case data, such as user story data, epic data, requirement data, approver data, completion data and/or the like. For example, SDLC management system 104 can provide a data stream 104a, which can include project planning data, timeline data, deliverable data, resource data (e.g., people, assets), and/or the like. For example, the change management system 106 can provide a data stream 106a, which can include asset data, application data, executable data, deployment instance data, and/or the like. For example, computing environment 108 can provide data regarding operational state of various applications 109, which it can exchange with the change management system 106. For example, subscriber device 112 can be an administrator device used to provide various configuration settings for the analytics system 110. Various additional systems can be interfaced with the analytics system 110 to provide additional data, such as, for example, active directory data including user names, email addresses, titles, and/or the like.

The data streams can be received by the analytics system 110 in real-time or scheduled mode through a suitable channel, including application programming interface (API) calls, RSS feeds, REST interfaces, batch file uploads, SQL queries, and/or the like. The data items can be structured according to various formats, such as RSS, CSV, HTML, XML, Excel, SQL query data sets, and/or the like.

Based on the received data, the analytics system 110 can be structured to generate one or more system data streams 110a, which can consolidate, optimize, aggregate, de-aggregate, transform, tag and/or otherwise process various data items in the received data streams. For example, in some implementations, the test data 102a and SDLC data 104a can be linked in the system data stream based on a suitable cross-referencing identifier, such as a user story identifier, epic identifier, project identifier, and/or the like. As another example, the test data 102a can be linked, via the SDLC data 104a, to application data 106a, by first cross-referencing the test data 102a with the SDLC data 104a and then cross-referencing the SDLC data 104a with application data 106a. In some implementations, the analytics system 110 can parse out the inbound data streams according to one or more criteria, such as application area, task type, requirement type, functional unit, application, server, network segment (subnet where the affected application(s) 109 are deployed), and/or the like such that only the specified relevant data is included in the outbound data stream 110a. To that end, one or more parser executables can be deployed at various points, including before the inbound data streams reach the analytics system 110, at the analytics system 110, and/or after the inbound data streams are generated and bound to user interfaces to be displayed (e.g., via client-side parsers at the subscriber devices 112). In some implementations, the outbound data stream 110a can include any of markup language tags, flat files, relational data, interface messages, key-value pairs and/or the like. In some implementations, data from the outbound data stream 110a is stored in a database.

Method(s) of Operation of the Example Analytics System(s)

FIG. 2 is a flow diagram illustrating an example process 200 for a traceability tool that generates a system data stream for an SDLC management platform that stitches together source data from multiple sources; trains a machine learning model to generate progress information and execution risks for a feature change (or user story) on the SDLC management platform; based on output from the machine learning model, generates a graphical user interface with information for each user story and corresponding progress tracking indicia; and for each user story, generates an event-based view of prior actions and one or more recommended actions to address execution risks. For example, some or all operations of process 200 can be performed and/or controlled by the analytics system 110, either alone or in combination with other system(s). As a general overview, process 200 can include receiving inbound data streams, extracting SDLC and/or application data from the received inbound data streams, generating determinations regarding the affected applications or other items in computing environments, generating predictions regarding impact of activities codified in the test and/or SDLC data on the computing environments, based on the generated predictions, generating a system data stream that includes various indicia, and binding the system data stream to a limited set of displayable smart dials and/or smart bars indicative of system state and/or generated predictions.

Figure 4:
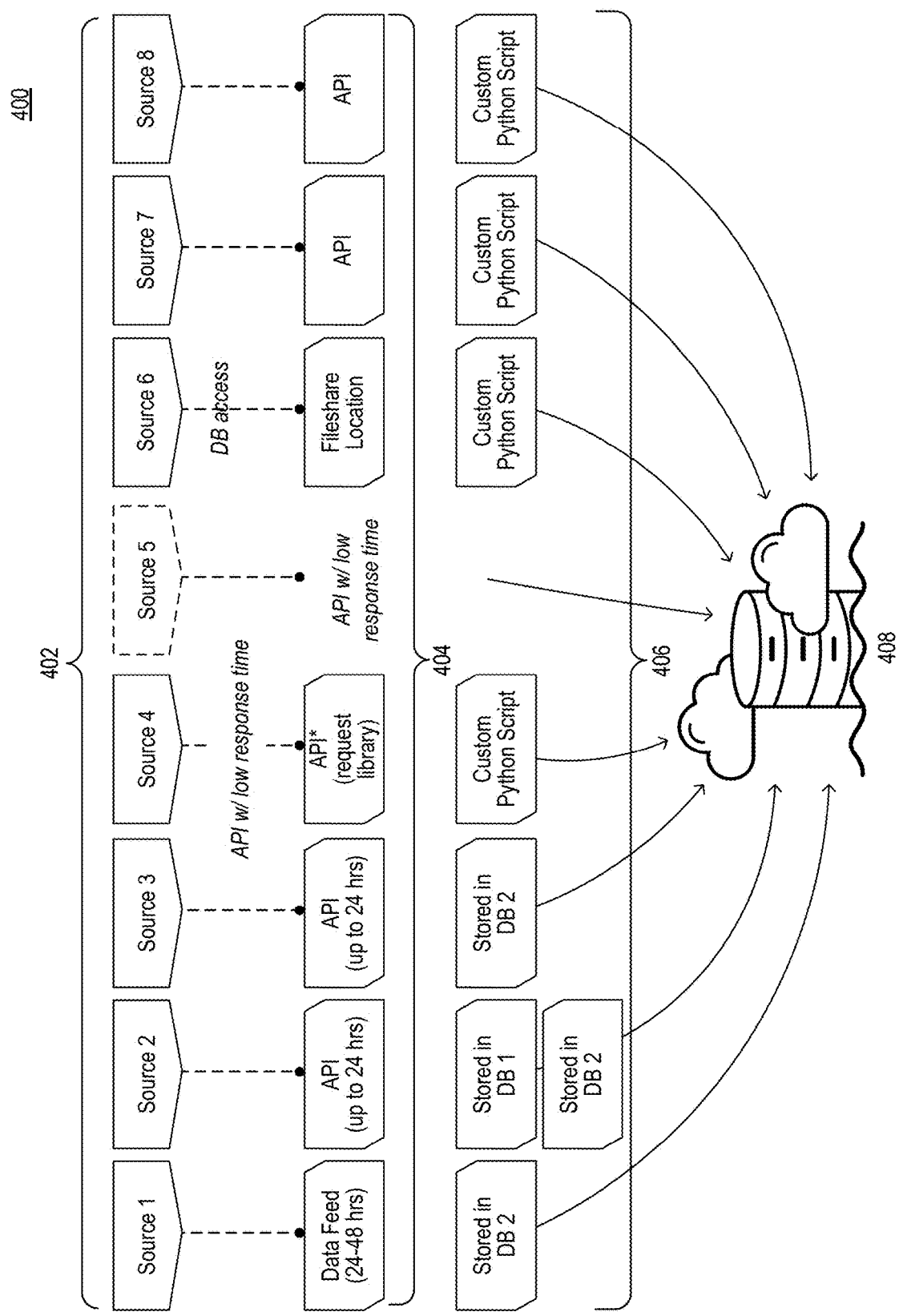
FIG. 4 is another block diagram illustrating example data flow for a software development lifecycle traceability tool in some implementations of the present technology.

In operation, at 202, the analytics system 110 generates a system data stream for a SDLC management platform that stitches together data from a plurality of computing systems. For example, for each computing system in the plurality of computing systems, the analytics system 110 may process a source data stream from the computing system to determine a datatype of data included in the source data stream. The source data stream may be associated with a plurality of user stories corresponding to the SDLC management platform. The analytics system 110 may, based on the determined datatype of the source data stream, process the source data stream to generate a transformed data stream for storage in a data repository. FIG. 4 shows an example of different source data streams and datatypes.

For example, the data can include a user story identifier, an epic identifier, a project identifier, a release identifier, an application identifier, or another identifier that, in whole or in part, can be cross-referenced to or otherwise used to determine relevant project data and application data. For example, the data can include a tag or another markup-language based item that includes the identifier or an item or items that can be used to determine an identifier.

At 204, the analytics system 110 trains a machine learning model based on the system data stream to generate progress information and one or more execution risks for an input user story identifier. In some implementations, the data can be fed to a machine learning model trained to determine (e.g., based on data labels, data types, data content, etc.) identifier candidates and/or corresponding likelihood scores for which data can be linked to data in other source data streams. FIG. 15 shows an example machine learning model that may be used though the embodiments described herein are not so limited.

At 206, the analytics system 110 generates a query to the machine learning model for each user story identifier of the plurality of user stories corresponding to the SDLC management platform.

At 208, the analytics system 110, based on output from the machine learning model, generates a graphical user interface displayable on a client device, wherein the graphical user interface includes information for each user story of the plurality of user stories and corresponding progress tracking indicia.

Figure 8:
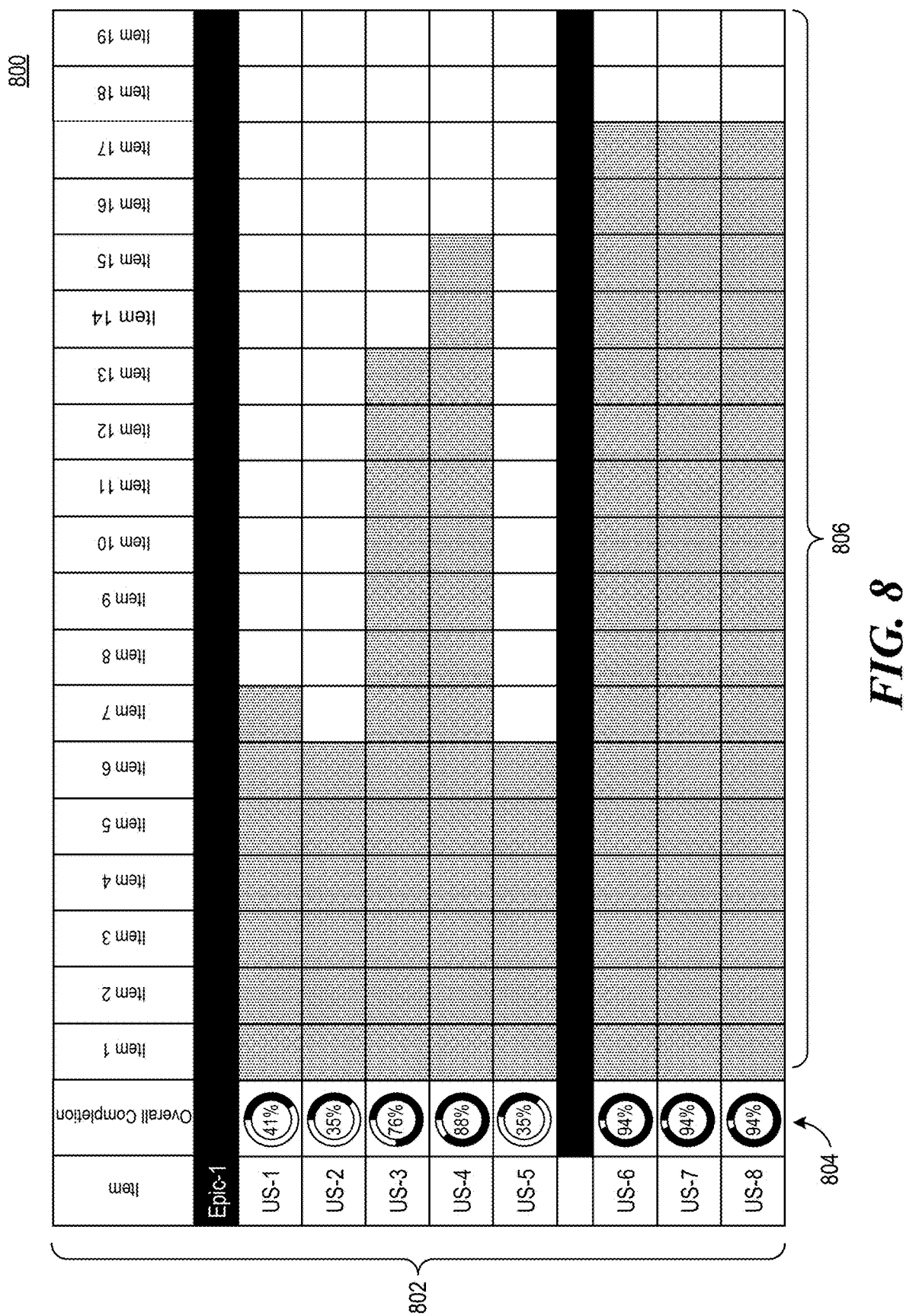
FIG. 8 is a GUI diagram illustrating yet another example display screen for a software development lifecycle traceability tool in some implementations of the present technology.

At 210, the analytics system 110 binds, to two or more controls on the graphical user interface, the progress information for the user story for each user story included in the graphical user interface. The two or more controls may include a first smart dial structured to provide, via a first progress tracker, a first visual indicium related to a completion of the user story and a second smart bar structured to provide, via a second progress tracker, a second visual indicium related to a current stage of engineering involvement for the user story. FIG. 8 shows an example smart dial and smart bar though the embodiments described herein are not so limited.

In some implementations, the system may automatically determine a completion percentage value for the first progress tracker of the first smart dial based on one or more items included in the system data stream. In some implementations, the system may evaluate the completion percentage value against a threshold and, based on the evaluation of the completion percentage value, generate a customized electronic notification.

In some implementations, the system may retrieve, from a data storage medium, an email message template. The system may extract, from the system data stream, at least one item. The system may cause a communications engine to determine a recipient based on the at least one item; generate, based on the email message template and the at least one item, an electronic notification for an entity; and transmit the electronic notification to the determined recipient.

At 212, the analytics system 110, based on the one or more execution risks for the user story, generates an event-based view of prior actions and one or more recommended actions to address the one or more execution risks for each user story included in the graphical user interface.

In some implementations, for a first user story, the analytics system 110 may determine that a period spent in a current stage of engineering involvement for the first user story exceeds a threshold period for the current stage. The system may generate, for display in the graphical user interface, a message indicating an intervening action may be required to progress the first user story to a next stage of engineering involvement. In some implementations, the system may determine a source for a blocking signal for the current stage of engineering involvement for the user story. The system may, based on the source for the blocking signal, generate a potential intervening action to progress the first user story to the next stage of engineering involvement. In some implementations, the system may generate, for display in the graphical user interface, a second message indicating the potential intervening action to progress the first user story to the next stage of engineering involvement. In some implementations, the system may, without user intervention, execute the potential intervening action to progress the first user story to the next stage of engineering involvement.

In some implementations, items in the graphical user interface may include alerts (e.g., based on templates associated with the generated data streams), notifications, destination paths to output data files that include items in the data stream, user interface controls and/or the like. For example, the analytics system 110 may determine (e.g., based on change management data) approver information and email addresses and generate notifications using this information. For example, the analytics system 110 may use the generated data stream to populate and/or configure user interface controls, such as smart dials. For example, the analytics system 110 may provide the generated data stream as an input to machine learning models or other predictive models for further analytics. Further analytics can include system impact analytics, system downtime analytics, developer efficiency analytics, query engines that underlie natural language processors (e.g., chat bots structured to operate on test case, SDLC control, and/or application data), and/or the like.

In some implementations, the system may generate various other predictions related to estimated impact on the applications, such as predicted downtime window, predicted downtime duration, predicted throughput/processing capacity (e.g., for interfaces), predicted CPU usage, predicted memory usage, predicted requests per minute, predicted bytes per request, predicted latency, predicted upload speed, predicted download speed, average response time, user satisfaction score, and/or the like. To generate the predictions, the system can use historical data regarding similar or related metrics along with the cross-referenced data from the test case and SDLC data streams.

In some implementations, a single system data stream includes data for the entire computing environment. In some implementations, multiple system data streams are dynamically constructed according to data stream configuration parameters. The data stream configuration parameters can, for example, specify smart dial display options (e.g., determining which smart dials/indicia to display), the type of data attributes to include in a particular generated system data stream (e.g., add or remove certain tags, such as owner/approver contact information, affected applications, system accessibility schemas, requirements type, defect severity), and so forth.

Feature(s) of the Example Analytics System(s)

According to various embodiments, the GUIs described herein enable end-to-end traceability of software feature changes for various computing systems within an organization. The GUIs can be implemented as one or more circuits, controls, binaries, graphics and/or other components that comprise a user interface, and can include programmable visual components (e.g., dials, sliders, grids, parsing controls, labels, checkboxes, option buttons and/or the like). In order to overcome the technical problems associated with small computer screens, the visual components can be bound to custom data streams. The custom data streams can be generated by the analytics system 110 based on data from several source systems. This architecture enables presentation of system data and insights via a limited number of configurable controls visible in a small number (e.g., one, two) of groups or screens at a time.

As a general overview, the GUIs can include resizable panels that can show various global items applicable to more than one individual view. Global items can include generated values determined using system data streams bound to individual controls shown on the GUIs. Global items can include, for example, a menu area, which can be populated with dynamically generated menu options relevant to the displayed individual controls. Global items can include, for example, header area, which can be populated dynamically (e.g., with values determined or calculated at run-time as the particular GUI is initialized, loaded, and/or refreshed) based on metadata generated for the system data streams, such as data timestamp, release information, number of completed projects according to a particular control variable, number of total projects, etc.

Figure 3:
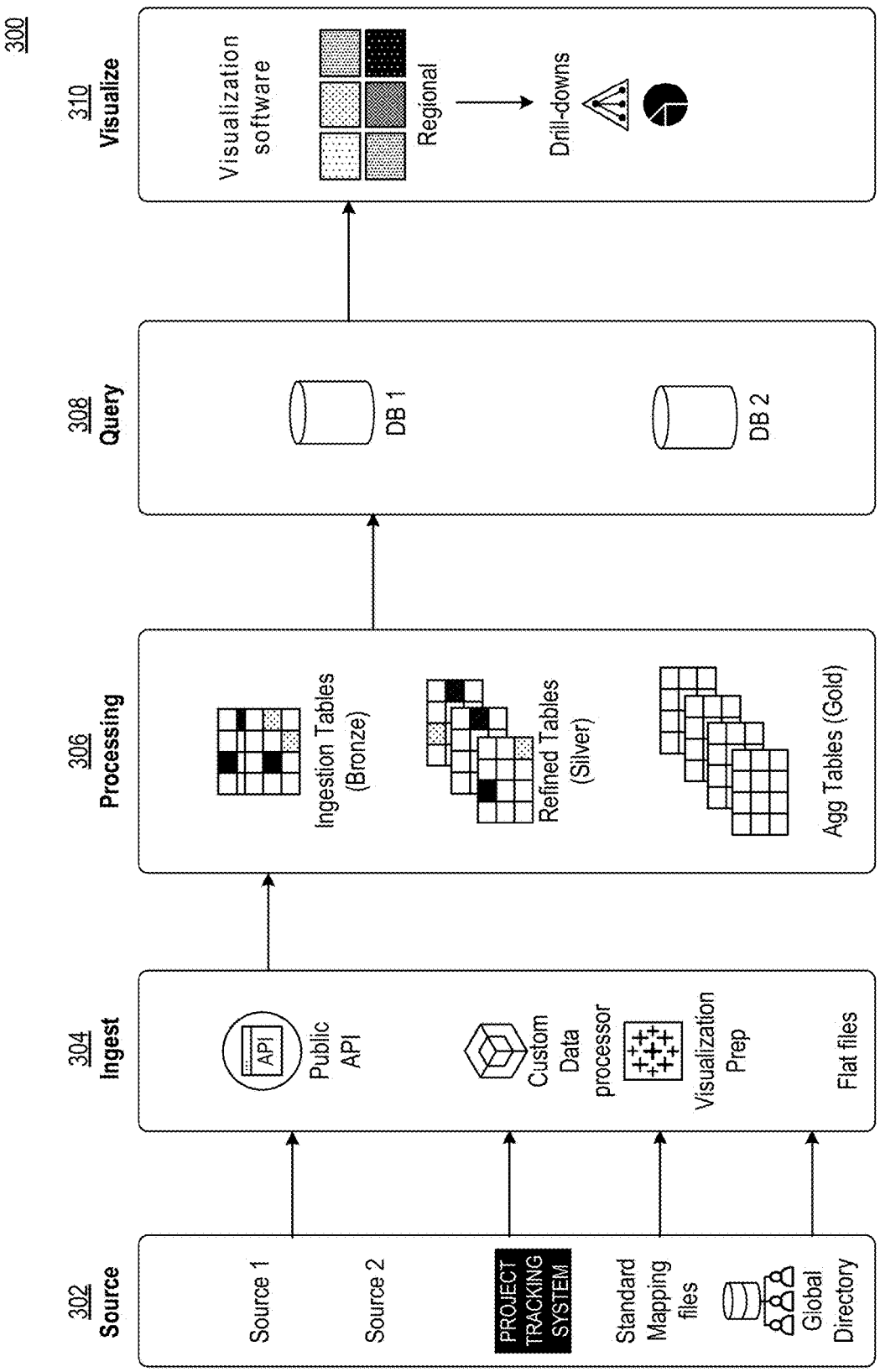
FIG. 3 is a block diagram illustrating example data flow for a software development lifecycle traceability tool in some implementations of the present technology.

FIG. 3 is a block diagram illustrating example data flow 300 for a software development lifecycle traceability tool in some implementations of the present technology. In some embodiments, the example data flow 300 may be the result of executing process 200 described with respect to FIG. 2. The traceability tool receives source data from multiple sources in source stage 302, such as JIRA, SNOW, etc. At ingest stage 304, the traceability tool generates a system data stream for an SDLC management platform that stitches together source data from multiple sources. At processing stage 306, the traceability tool trains a machine learning model to generate progress information and execution risks for a feature change (or user story) on the SDLC management platform. At query stage 308, the traceability tool queries the machine learning model for each user story identifier of a plurality of user stories corresponding to the SDLC management platform. At visualize stage 310, based on output from the machine learning model, the traceability tool generates a graphical user interface with information for each user story and corresponding progress tracking indicia and, for each user story, generates an event-based view of prior actions and one or more recommended actions to address execution risks.

FIG. 4 is another block diagram illustrating example data flow 400 for a software development lifecycle traceability tool in some implementations of the present technology. As shown in FIG. 3, source data can be retrieved from multiple sources. Such sources 402 may have different means 404, 406 of accessing data, including application programming interfaces, fileshare locations, etc. The retrieved data may be stored in different storage 404 before being ingested and subsequently combined into data repository 408.

Figure 5:
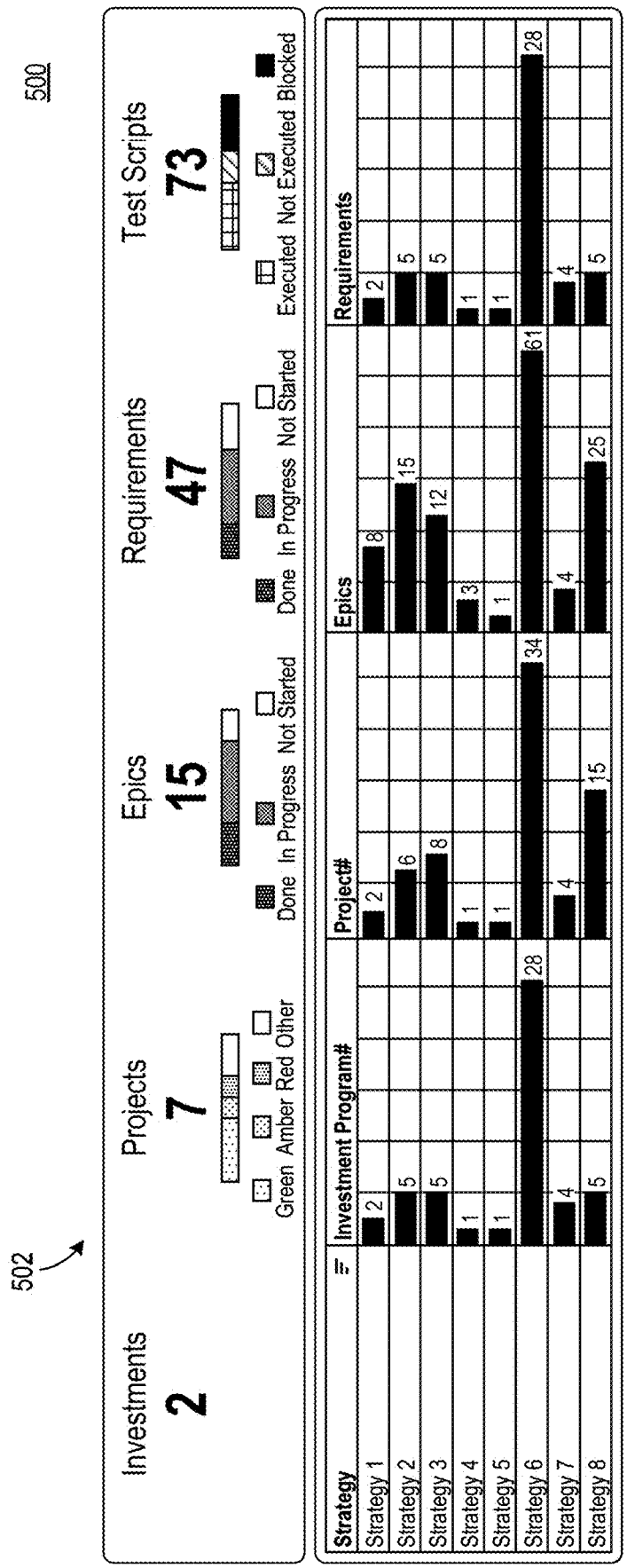
FIG. 5 is a GUI diagram illustrating an example display screen for a software development lifecycle traceability tool in some implementations of the present technology.

FIG. 5 is a GUI diagram illustrating an example display screen 500 for a software development lifecycle traceability tool in some implementations of the present technology. In some implementations, the landing screens (502, 504) are summary screens. The summary screens can be populated with configurable summary controls that illustrate individual system management and/or performance parameters determined based on the generated system data stream(s). According to various implementations, the controls can include graphical and/or text elements and can show progress and/or completion status in absolute or relative numerical terms (e.g., a count, a percentage of total).

Figure 6:
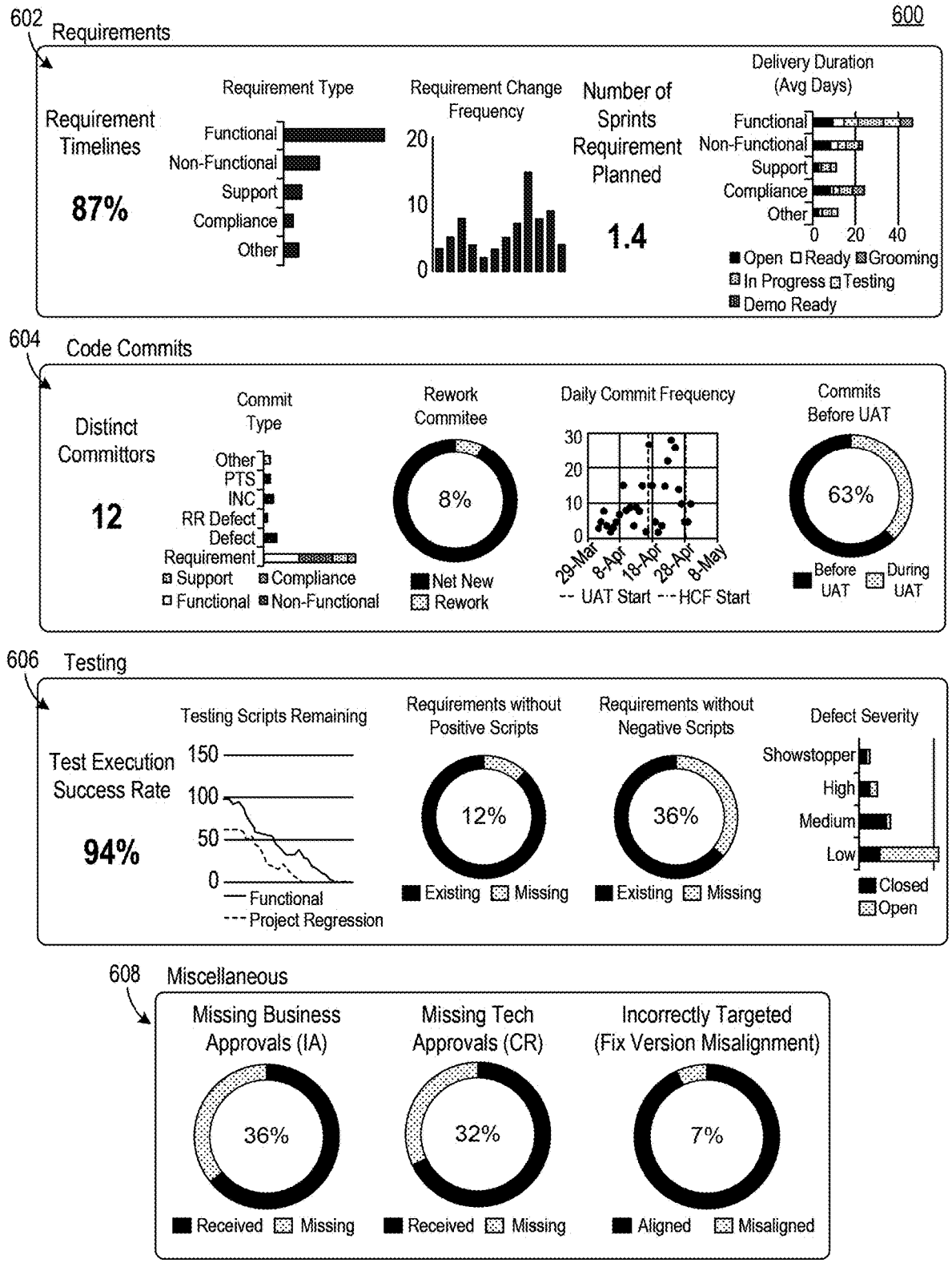
FIG. 6 is a GUI diagram illustrating another example display screen for a software development lifecycle traceability tool in some implementations of the present technology.

FIG. 6 is a GUI diagram illustrating an example display screen 600 for a software development lifecycle traceability tool in some implementations of the present technology. In some implementations, the landing screens (602, 604, 606, 608) are summary screens. The summary screens can be populated with configurable summary controls that illustrate individual system management and/or performance parameters determined based on the generated system data stream(s). In some implementations, the controls can be implemented as one or more smart dials. The smart dials can include one or more graphical elements. The graphical elements can be parametrized and programmatically configurable based on system data stream data, system data stream metadata, and/or dynamically determined/calculated values using the system data stream data and/or supplemental data related to one or more items in the system data stream. For example, a particular smart dial can include a graphical element (e.g., an arc, a progress bar, a circle, and/or the like) whose color, fill, opacity, and/or another suitable property affecting the display of the element is set dynamically based on the above parameters. In some implementations, detecting a user interaction with a particular smart dial causes the system to display a corresponding user interface that provides further information from the system data stream. In some implementations, detecting a user interaction with an item in further information causes the system to display a corresponding user interface that provides a log-in page to the corresponding source system (based, e.g., on a tag in the system data stream that identifies the source system(s) for a particular data item).

Figure 7:
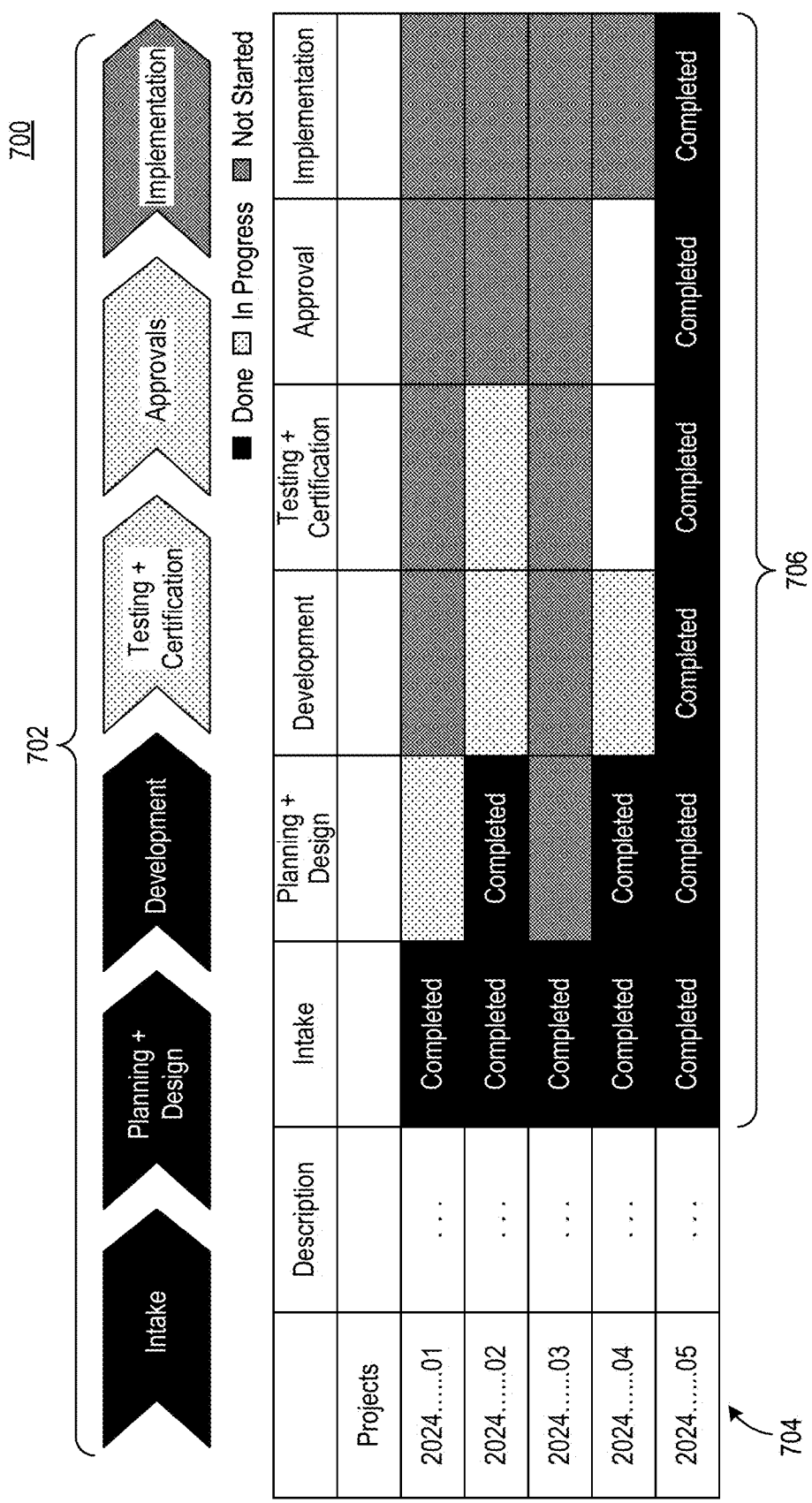
FIG. 7 is a GUI diagram illustrating yet another example display screen for a software development lifecycle traceability tool in some implementations of the present technology.

FIG. 7 is a GUI diagram illustrating an example display screen 700 for a software development lifecycle traceability tool in some implementations of the present technology. In some implementations, GUI diagrams (702, 704, 706) illustrate example end-to-end traceability of software feature changes by project of the disclosed system in some implementations of the present technology. As a general overview, the GUI diagrams illustrate implementations where the project-level items from the generated system data stream are used to determine the state of project execution relative to system requirements. Ordinarily, such single-screen insights are not available via conventional test, project tracking, application tracking, change management, and other systems. As shown, in some implementations, analytics can be performed for more than one project and/or application at the same time, and overall progress statistics for the selected project and/or application set can be determined and displayed.

FIG. 8 is a GUI diagram illustrating an example display screen 800 for a software development lifecycle traceability tool in some implementations of the present technology. In some implementations, to optimize system performance, end-to-end traceability of software feature changes (802, 804, 806) can be built into (e.g., at the computational logic layer) the set of operations that generates the system data stream and/or can be performed after the system data stream is generated and before various elements of the system data stream are bound to the GUI controls. For example, when the system data stream is generated, project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed executed test cases may change dynamically, the executed case counts can be determined dynamically as the GUI is provided to the subscriber. As a general overview, the GUI diagrams illustrate implementations where the project-level items from the generated system data stream are used to generate end-to-end insights into the system development lifecycle data. The GUI diagrams illustrate implementations where the project-level items from the generated system data stream are used to determine and/or predict the impact of project items (e.g., a release of a feature) on connected applications. For example, determining and/or predicting the impact can include determining and/or generating a prediction regarding whether a particular connected application works as intended after the project item is released. Ordinarily, such single-screen insights are not available via conventional test, project tracking, application tracking, change management, and other systems. As shown, in some implementations, analytics can be performed for more than one project and/or application at the same time, and overall progress statistics for the selected project and/or application set can be determined and displayed. For example, as shown in FIG. 8, user stories and their associated project completion status can be presented by user story. In some implementations, project data can be prioritized or otherwise sequenced, altered, or enhanced by applying to the project data a set of parsing criteria and/or supplemental project information, such as priority information, received from a project tracking system.

Figure 9:
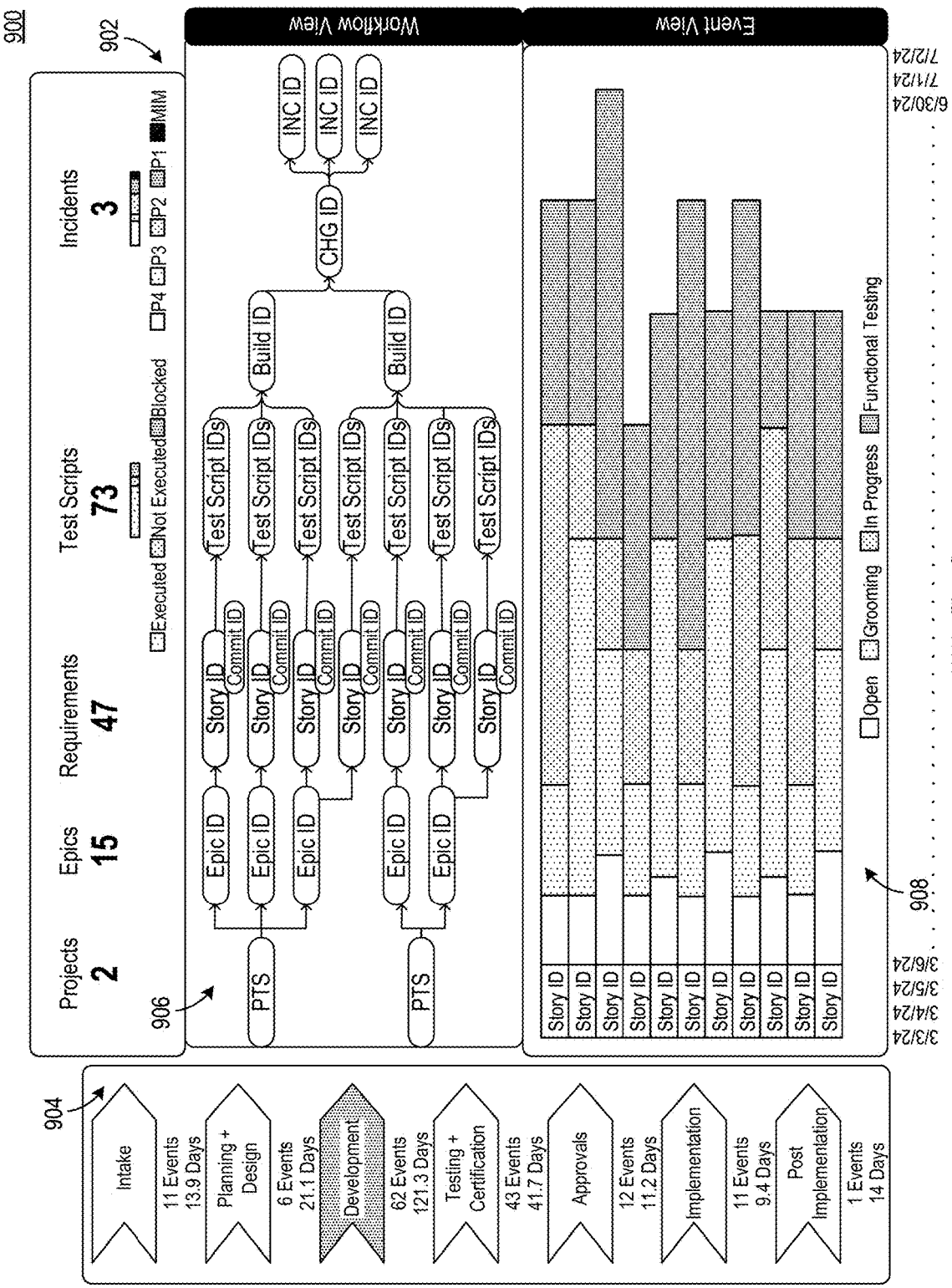
FIG. 9 is a GUI diagram illustrating yet another example display screen for a software development lifecycle traceability tool in some implementations of the present technology.

FIG. 9 is a GUI diagram illustrating an example display screen 900 for a software development lifecycle traceability tool in some implementations of the present technology. In some implementations, to optimize system performance, post mortem analytics (902, 904, 906, 908) can be built into (e.g., at the computational logic layer) the set of operations that generates the system data stream and/or can be performed after the system data stream is generated and before various elements of the system data stream are bound to the GUI controls. For example, when the system data stream is generated, project data can be tagged and/or linked based on a determined common identifier, such as a project identifier and/or a user story identifier. For example, when the system data stream is generated, in order to increase the speed of data retrieval when the GUI is displayed, affected applications can be determined and the data stream can be tagged with the corresponding affected application information. For example, because the number of items that represent completed project regression test cases may change dynamically, the executed case counts can be determined dynamically as the GUI is provided to the subscriber. As a general overview, the GUI diagrams illustrate implementations where the project-level items from the generated system data stream are used to determine and/or predict the extent to which identified system defects have been resolved. For example, determining and/or predicting the system defects can include determining and/or generating a prediction regarding an extent (e.g., percentage) to which deviations from requirements (e.g., identified based on the test data) for a particular feature have been resolved. Ordinarily, such single-screen insights are not available via conventional test, project tracking, application tracking, change management, and other systems. As shown, in some implementations, analytics can be performed for more than one project and/or application at the same time, and overall system control statistics for the selected project and/or application set can be determined and displayed.

Machine Learning Model(s) of the Example Analytics System(s)

Figure 10:
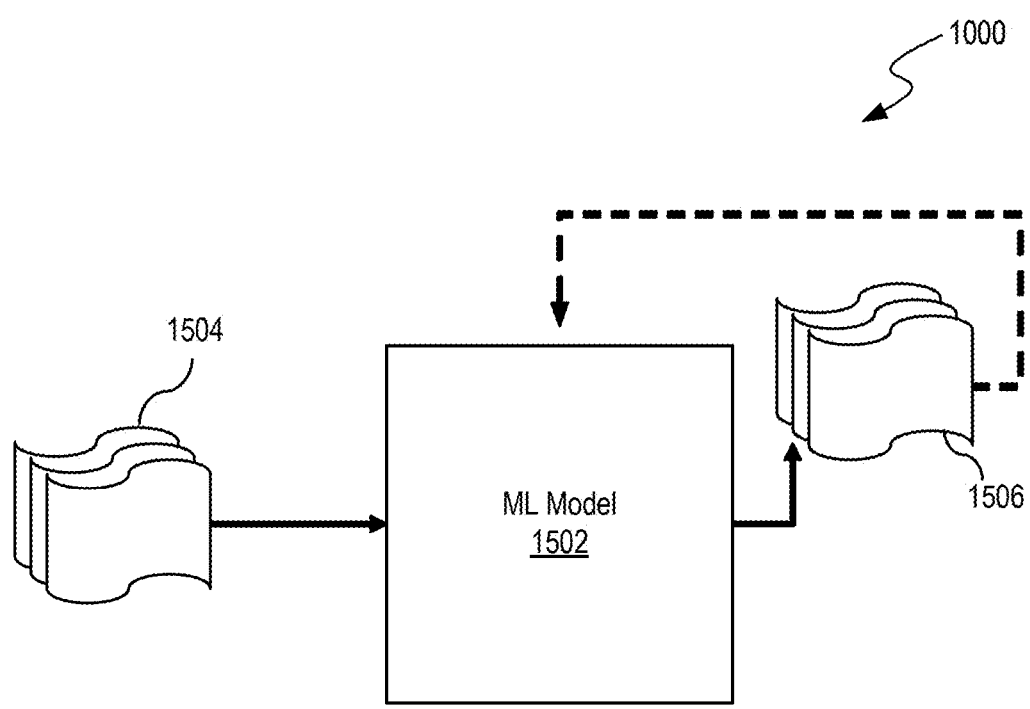
FIG. 10 is a block diagram illustrating an example machine learning model of a computing environment in which the disclosed system operates in some implementations of the present technology.

FIG. 10 is a block diagram 1000 illustrating an example machine learning model 1502 of a computing environment in which the disclosed system operates in some implementations of the present technology. According to various implementations, analytics system 110 can include one or more machine learning models. The machine learning models can be structured to perform any suitable artificial intelligence-based operations to perform end-to-end traceability of software feature changes for various computing systems within an organization and/or the like. Machine learning models can include one or more convolutional neural networks (CNN), deep learning (DL) models, translational models, natural language processing (NLP) models, computer vision-based models, or any other suitable models for enabling the operations described herein.

In some implementations, the machine learning models, such as the machine learning model 1502, can include one or more neural networks. As an example, neural networks may be based on a large collection of neural units (or artificial neurons). Neural networks may loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit may have a summation function which combines the values of all its inputs together. In some embodiments, each connection (or the neural unit itself) may have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free-flowing, with connections interacting in a more chaotic and complex fashion.

As an example, machine learning model 1502 can ingest inputs 1504 and provide outputs 1506. In one use case, outputs 1506 can be fed back to a machine learning model as inputs to train the machine learning model (e.g., alone or in conjunction with user indications of the accuracy of outputs, labels associated with the inputs, or with other reference feedback information). In another use case, a machine learning model 1502 can update its configurations (e.g., weights, biases, or other parameters) based on its assessment of its prediction (e.g., outputs 1506) and reference feedback information (e.g., user indication of accuracy, reference labels, or other information). In another use case, where a machine learning model 1502 is a neural network, connection weights can be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this manner, for example, the machine learning model 1502 may be trained to generate better predictions.

As an example, where the prediction models include a neural network, the neural network can include one or more input layers, hidden layers, and output layers. The input and output layers can respectively include one or more nodes, and the hidden layers may each include a plurality of nodes. When an overall neural network includes multiple portions trained for different objectives, there may or may not be input layers or output layers between the different portions. The neural network can also include different input layers to receive various input data. Also, in differing examples, data can input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

According to various implementations, machine learning models can be trained based on information stored in a local data store associated with the analytics system 110 and/or a remote data store associated with the analytics system 110.
Example Architecture(s) of the Example Analytics System(s)

Figure 11:
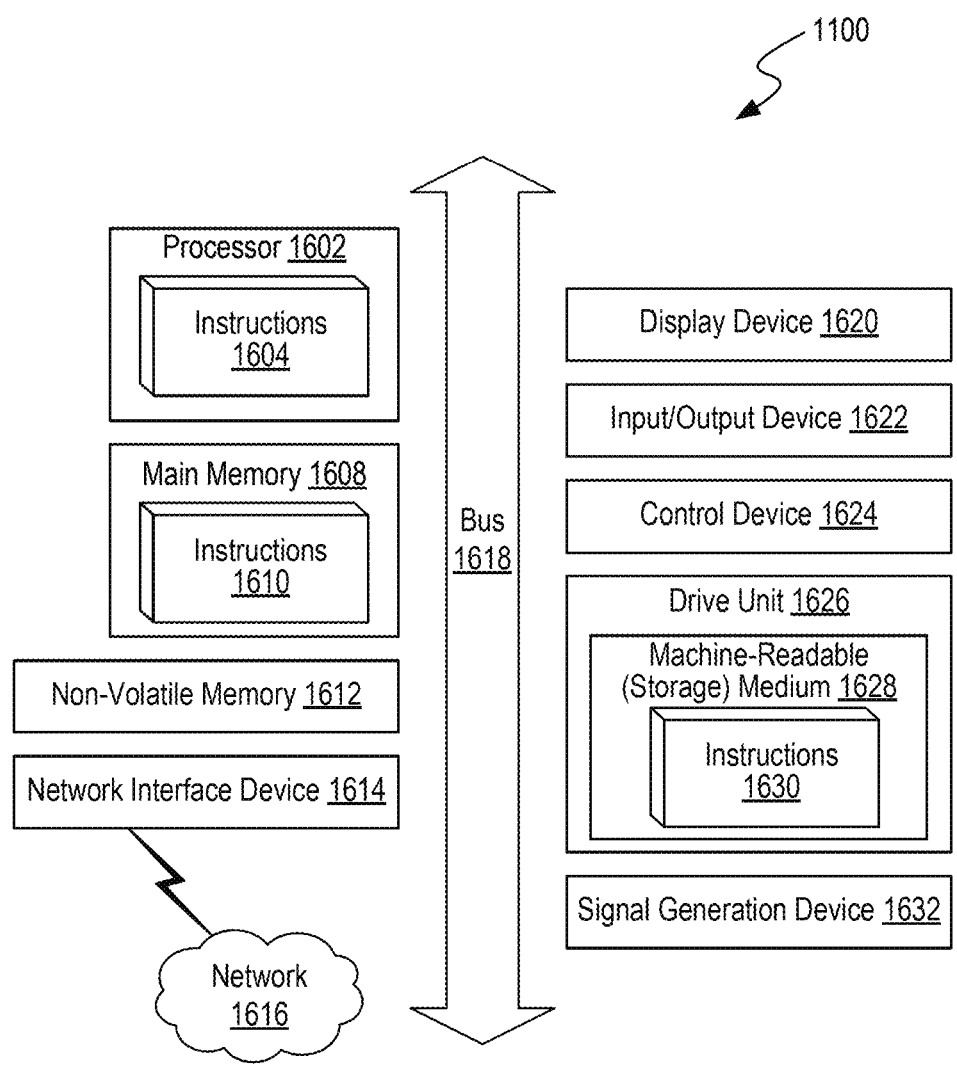
FIG. 11 is a block diagram illustrating an example of a computing environment in which the disclosed system operates in some implementations of the present technology.

FIG. 11 is a block diagram illustrating an example of a computing environment 1100 in which the disclosed system operates in some implementations of the present technology. In various implementations, these computer systems and other devices can include server computer systems, desktop computer systems, laptop computer systems, netbooks, mobile phones, personal digital assistants, televisions, cameras, automobile computers, electronic media players, etc. In various implementations, the computer systems and devices include zero or more of each of the following: a central processing unit (CPU) 1602 for executing computer programs, e.g., instructions 1604; a computer memory 1608 for storing programs and data, e.g., instructions 1610, while they are being used, including the facility and associated data, an operating system including a kernel, and device drivers; a persistent storage device or a non-volatile memory 1612, such as a hard drive or flash drive for persistently storing programs and data; a drive unit 1626 including computer-readable media drives 1628 that are tangible storage means that do not include a transitory, propagating signal, such as a floppy, CD-ROM, or DVD drive, for reading programs and data, e.g., instructions 1630, stored on a computer-readable medium; a network interface device 1614 with a network connection 1616 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like; a bus 1618; a display device 1620; an input/output device 1622; a control device 1624; and a signal generation device 1632. While computer systems configured as described above are typically used to support the operation of a facility, those skilled in the art will appreciate that the facility may be implemented using devices of various types and configurations, and having various components.

Figure 12:
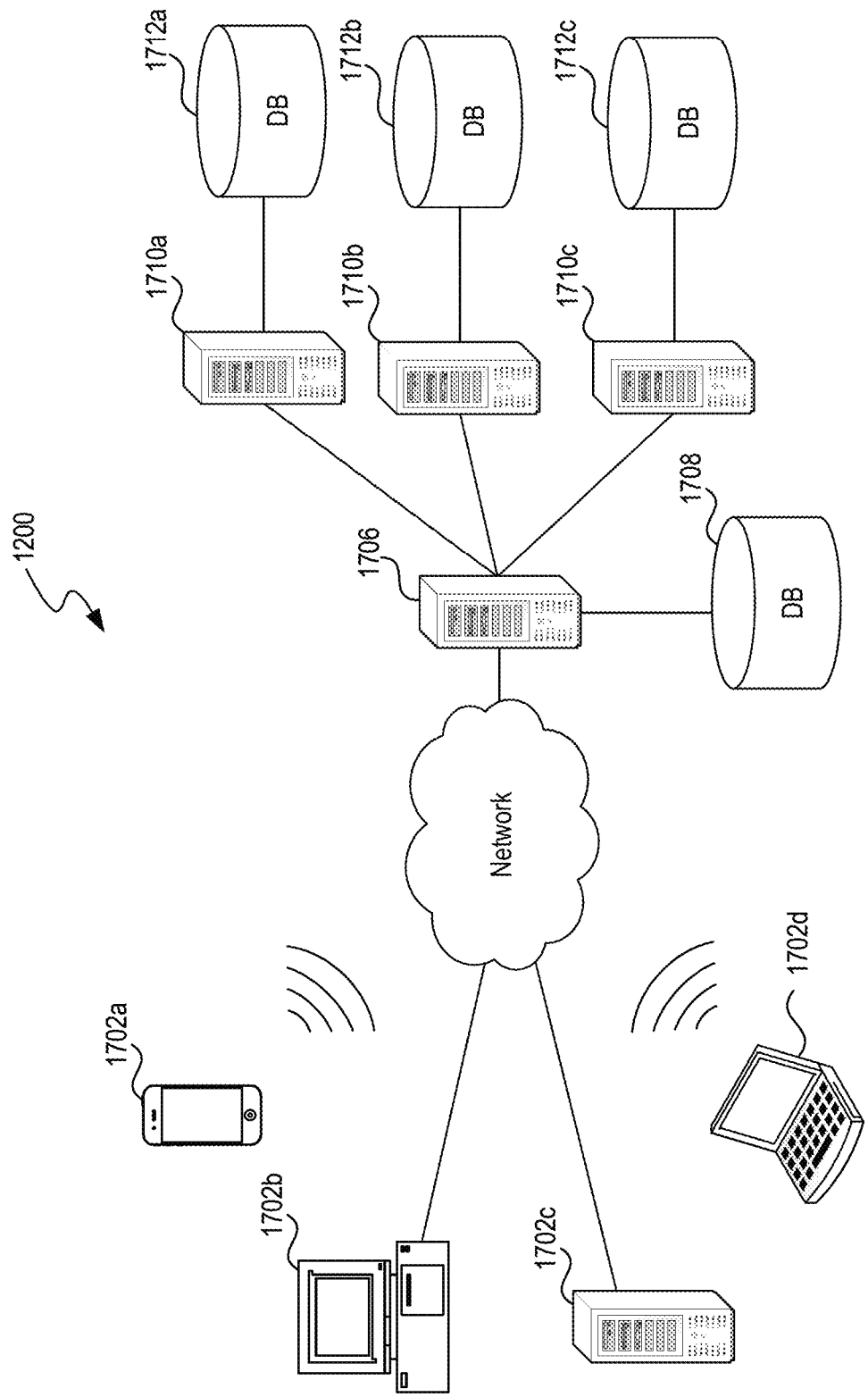
FIG. 12 is a system diagram showing some of the components typically incorporated in at least some of the computer systems and other devices on which the disclosed system operates in accordance with some implementations of the present technology.

FIG. 12 is a system diagram showing some of the components typically incorporated in at least some of the computer systems and other devices on which the disclosed system operates in accordance with some implementations of the present technology. In some implementations, environment 1200 includes one or more client computing devices 1702A-D, examples of which can host the analytics system 110. Client computing devices 1702A-D operate in a networked environment using logical connections through network 1704 to one or more remote computers, such as a server computing device.

In some implementations, server 1706 is an edge server which receives client requests and coordinates fulfillment of those requests through other servers, such as servers 1710A-C. In some implementations, server 1706 connects to a corresponding database 1708. In some implementations, server computing devices 1710A-C comprise computing systems, such as the analytics system 110. Though each server computing device 1710A-C is displayed logically as a single server, server computing devices can each be a distributed computing environment encompassing multiple computing devices located at the same or at geographically disparate physical locations. In some implementations, each server 1710A-C corresponds to a group of servers.

Client computing devices 1702A-D and server computing devices 1710A-C can each act as a server or client to other server or client devices. In some implementations, servers 1710A-C connect to a corresponding database 1712A-C. As discussed above, each server 1710A-C can correspond to a group of servers, and each of these servers can share a database or can have its own database. Databases 1712A-C warehouse (e.g., store) information such items included in various data streams. Though databases 1712A-C are displayed logically as single units, databases 1712A-C can each be a distributed computing environment encompassing multiple computing devices, can be located within their corresponding server, or can be located at the same or at geographically disparate physical locations.

Network 1704 can be a local area network (LAN) or a wide area network (WAN), but can also be other wired or wireless networks. In some implementations, network 1704 is the Internet or some other public or private network. Client computing devices 1702A-D are connected to network 1704 through a network interface, such as by wired or wireless communication. While the connections between server 1706 and servers 1710A-C are shown as separate connections, these connections can be any kind of local, wide area, wired, or wireless network, including network 1704 or a separate public or private network.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. One or more non-transitory computer-readable media storing instructions, which when executed by at least one processor, perform operations comprising:

generating, by an analytics circuit, a system data stream for a software development lifecycle (SDLC) management platform that stitches together data from a plurality of computing systems, comprising:
for each computing system in the plurality of computing systems:
processing, by the analytics circuit, a source data stream from the computing system to determine a datatype of data included in the source data stream, wherein the source data stream is associated with a plurality of user stories corresponding to the SDLC management platform; and
based on the determined datatype of the source data stream, processing, by the analytics circuit, the source data stream to generate a transformed data stream for storage in a data repository;
training, by the analytics circuit, a machine learning model based on the system data stream to generate progress information and one or more execution risks for an input user story identifier;
generating a query to the machine learning model for each user story identifier of the plurality of user stories corresponding to the SDLC management platform;
based on output from the machine learning model including (i) progress information and (ii) one or more execution risks for each user story identifier, generating a graphical user interface displayable on a client device communicatively coupled to the analytics circuit, wherein the graphical user interface includes information for each user story of the plurality of user stories and corresponding progress tracking indicia; and
for each user story included in the graphical user interface:
based on a first output from the machine learning model including progress information for a corresponding user story identifier, binding, to two or more controls on the graphical user interface, the progress information for the user story, wherein the two or more controls comprise a first smart dial structured to provide, via a first progress tracker, a first visual indicium related to a completion of the user story and a second smart bar structured to provide, via a second progress tracker, a second visual indicium related to a current stage of engineering involvement for the user story; and
based on a second output from the machine learning model including one or more execution risks for the corresponding user story identifier, generating an event-based view of prior actions and one or more recommended actions to address the one or more execution risks.

2. A method for providing end-to-end traceability and risk management of software development lifecycle (SDLC) management platforms, the method comprising:
generating a system data stream for a software development lifecycle (SDLC) management platform that stitches together data from a plurality of computing systems;
receiving a machine learning model trained based on the system data stream to generate progress information and one or more execution risks for an input user story identifier;
generating a query to the machine learning model for each user story identifier of the plurality of user stories corresponding to the SDLC management platform;
based on output from the machine learning model including (i) progress information and (ii) one or more execution risks for each user story identifier, generating a graphical user interface displayable on a client device, wherein the graphical user interface includes information for each user story of the plurality of user stories and corresponding progress tracking indicia; and for each user story included in the graphical user interface:

based on a first output from the machine learning model including progress information for a corresponding user story identifier, binding, to two or more controls on the graphical user interface, the progress information for the user story, wherein the two or more controls comprise a first smart dial structured to provide, via a first progress tracker, a first visual indicium related to a completion of the user story and a second smart bar structured to provide, via a second progress tracker, a second visual indicium related to a current stage of engineering involvement for the user story; and based on a second output from the machine learning model including one or more execution risks for the corresponding user story identifier, generating an event-based view of prior actions and one or more recommended actions to address the one or more execution risks.

3. The method of claim 2, wherein generating the system data stream for the SDLC management platform comprises:

for each computing system in the plurality of computing systems:

processing a source data stream from the computing system to determine a datatype of data included in the source data stream, wherein the source data stream is associated with a plurality of user stories corresponding to the SDLC management platform; and based on the determined datatype of the source data stream, processing the source data stream to generate a transformed data stream for storage in a data repository.

4. The method of claim 2, further comprising:

for a first user story, determining that a period spent in a current stage of engineering involvement for the first user story exceeds a threshold period for the current stage; and generating, for display in the graphical user interface, a message indicating an intervening action may be required to progress the first user story to a next stage of engineering involvement.

5. The method of claim 4, further comprising:

determining a source for a blocking signal for the current stage of engineering involvement for the user story; and based on the source for the blocking signal, generating a potential intervening action to progress the first user story to the next stage of engineering involvement.

6. The method of claim 5, further comprising:

generating, for display in the graphical user interface, a second message indicating the potential intervening action to progress the first user story to the next stage of engineering involvement.

7. The method of claim 5, further comprising:

without user intervention, executing the potential intervening action to progress the first user story to the next stage of engineering involvement.

8. The method of claim 2, further comprising:

automatically determining a completion percentage value for the first progress tracker of the first smart dial based on one or more items included in the system data stream.

9. The method of claim 8, further comprising:

evaluating the completion percentage value against a threshold; and based on the evaluation of the completion percentage value, generating a customized electronic notification.

10. The method of claim 9, further comprising:

retrieving, from a data storage medium, an email message template;

extracting, from the system data stream, at least one item; and causing a communications engine to:

determine a recipient based on the at least one item;

generate, based on the email message template and the at least one item, an electronic notification for an entity; and transmit the electronic notification to the determined recipient.

11. A system comprising at least one processor and one or more non-transitory, computer-readable media having instructions stored thereon that, when executed by the at least one processor, cause the at least one processor to perform operations comprising:

generating a system data stream for a software development lifecycle (SDLC) management platform that stitches together data from a plurality of computing systems;

receiving a machine learning model trained based on the system data stream to generate progress information and one or more execution risks for an input user story identifier;

generating a query to the machine learning model for each user story identifier of the plurality of user stories corresponding to the SDLC management platform;

based on output from the machine learning model including (i) progress information and (ii) one or more execution risks for each user story identifier, generating a graphical user interface displayable on a client device, wherein the graphical user interface includes information for each user story of the plurality of user stories and corresponding progress tracking indicia;

based on a first output from the machine learning model including progress information for a corresponding user story identifier, binding, to two or more controls on the graphical user interface, the progress information for the user story; and based on a second output from the machine learning model including one or more execution risks for the corresponding user story identifier, generating an event-based view of prior actions and one or more recommended actions to address the one or more execution risks.

12. The system of claim 11, wherein generating the system data stream for the SDLC management platform comprises:

for each computing system in the plurality of computing systems:

processing a source data stream from the computing system to determine a datatype of data included in the source data stream, wherein the source data stream is associated with a plurality of user stories corresponding to the SDLC management platform; and based on the determined datatype of the source data stream, processing the source data stream to generate a transformed data stream for storage in a data repository.

13. The system of claim 11, the operations further comprising:

for each user story included in the graphical user interface:

binding, to two or more controls on the graphical user interface, the progress information for the user story, wherein the two or more controls comprise a first smart dial structured to provide, via a first progress tracker, a first visual indicium related to a completion of the user story and a second smart bar structured to provide, via a second progress tracker, a second visual indicium related to a current stage of engineering involvement for the user story; and based on the one or more execution risks for the user story, generating an event-based view of prior actions and one or more recommended actions to address the one or more execution risks.

14. The system of claim 11, the operations further comprising:

for a first user story, determining that a period spent in a current stage of engineering involvement for the first user story exceeds a threshold period for the current stage; and generating, for display in the graphical user interface, a message indicating an intervening action may be required to progress the first user story to a next stage of engineering involvement.

15. The system of claim 14, the operations further comprising:

determining a source for a blocking signal for the current stage of engineering involvement for the user story; and based on the source for the blocking signal, generating a potential intervening action to progress the first user story to the next stage of engineering involvement.

16. The system of claim 15, the operations further comprising:

generating, for display in the graphical user interface, a second message indicating the potential intervening action to progress the first user story to the next stage of engineering involvement.

17. The system of claim 15, the operations further comprising:

without user intervention, executing the potential intervening action to progress the first user story to the next stage of engineering involvement.

18. The system of claim 13, the operations further comprising:

automatically determining a completion percentage value for the first progress tracker of the first smart dial based on one or more items included in the system data stream.

19. The system of claim 18, the operations further comprising:

evaluating the completion percentage value against a threshold; and based on the evaluation of the completion percentage value, generating a customized electronic notification.

20. The system of claim 19, the operations further comprising:

retrieving, from a data storage medium, an email message template;

extracting, from the system data stream, at least one item; and causing a communications engine to:
  determine a recipient based on the at least one item;
  generate, based on the email message template and the at least one item, an electronic notification for an entity; and
  transmit the electronic notification to the determined recipient.

* * * * *